United States Patent
Yamada

(10) Patent No.: US 10,671,897 B2
(45) Date of Patent: Jun. 2, 2020

(54) IMAGE PROCESSING APPARATUS

(71) Applicant: Oki Data Corporation, Tokyo (JP)

(72) Inventor: Takahiro Yamada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/252,777

(22) Filed: Jan. 21, 2019

(65) Prior Publication Data

US 2019/0236420 A1  Aug. 1, 2019

(30) Foreign Application Priority Data

Jan. 30, 2018 (JP) ................................ 2018-013363

(51) Int. Cl.
*G06K 15/02* (2006.01)
*G06F 3/12* (2006.01)

(52) U.S. Cl.
CPC ....... *G06K 15/1822* (2013.01); *G06F 3/1215* (2013.01); *G06F 3/1242* (2013.01); *G06K 15/1852* (2013.01)

(58) Field of Classification Search
CPC ............ G06K 15/1822; G06K 15/1852; G06F 3/1215; G06F 3/1242
USPC ................... 358/3.01, 1.9, 1.15, 518
See application file for complete search history.

(56) References Cited

U.S. PATENT DOCUMENTS

| 9,886,220 | B1* | 2/2018 | Dellert | ............. | G06F 3/121 |
| 2007/0133058 | A1* | 6/2007 | Seki | ............. | H04N 1/407 |
| | | | | | 358/3.01 |
| 2009/0034005 | A1* | 2/2009 | Gotoh | ............. | H04N 1/40062 |
| | | | | | 358/3.06 |
| 2009/0097043 | A1* | 4/2009 | Gotoh | ............. | H04N 1/3935 |
| | | | | | 358/1.2 |
| 2012/0019844 | A1* | 1/2012 | Tonami | ............. | G06K 15/027 |
| | | | | | 358/1.9 |
| 2014/0204418 | A1* | 7/2014 | Yumita | ............. | G06F 3/1204 |
| | | | | | 358/1.15 |

FOREIGN PATENT DOCUMENTS

JP  2007-301893 A  11/2007

* cited by examiner

*Primary Examiner* — Quang N Vo
(74) *Attorney, Agent, or Firm* — Muncy, Geissler, Olds & Lowe, P.C.

(57) ABSTRACT

An image processing apparatus includes an image processing part that creates bitmap data based on print data input from outside, a density correction part that performs predetermined density correction such that a density of a print image, which is formed on a print medium, is maintained within a regulated range, and a determination part that determines whether or not it is necessary to re-create the bitmap data based on the print data according to a comparison result between a first density value which is created at a timing when the bitmap data is created and a second density value which is created at a timing when the density correction is performed by the density correction part. Wherein the image processing part re-creates the bitmap data based on the print data when the determination part determines that it is necessary to re-create the bitmap data, and does not re-create the bitmap data when the determination part determines that it is not necessary to re-create the bitmap data.

8 Claims, 8 Drawing Sheets

| File Name | Density Value | | | | Original Data Storage Address | Bitmap Data Storage Address |
|---|---|---|---|---|---|---|
| | C | M | Y | K | | |
| overlay1.pcl | 0.70 | 0.70 | 0.70 | 0.70 | ......... | ......... |

32C  32M  32Y  32K

Fig. 4B  Idth

| C | M | Y | K |
|---|---|---|---|
| 0.05 | 0.05 | 0.10 | 0.05 |

Idth(C)  Idth(M)  Idth(Y)  Idth(K)

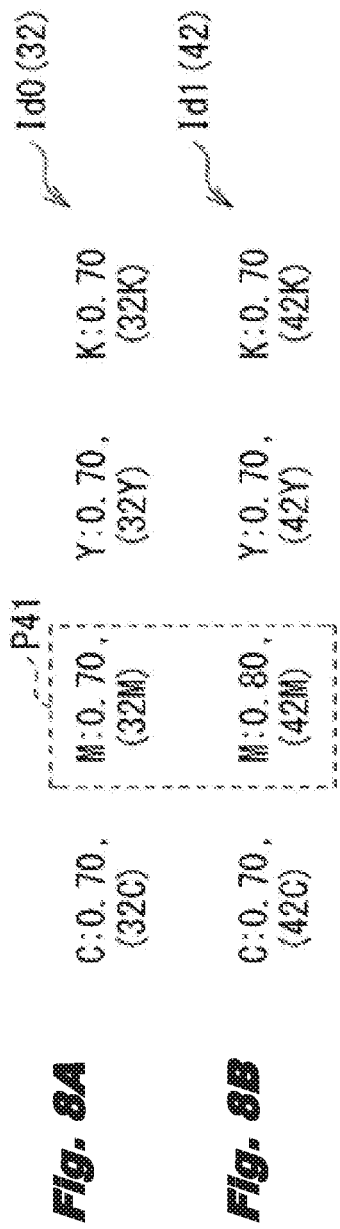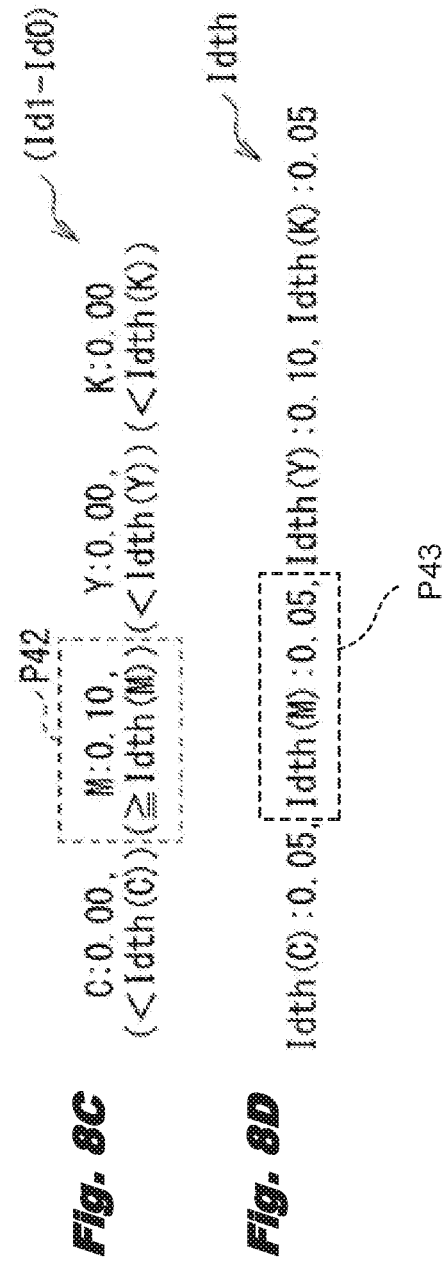

Fig. 9A (1st Modified Embodiment)

| File Name | Image Type | Density Value | | | | |
|---|---|---|---|---|---|---|
| | | C | M | Y | K | |
| overlay2.pcl | Image | 0.70 | 0.70 | 0.70 | 0.70 | ... |

32C, 32M, 32Y, 32K — Id0

Fig. 9B (1st Modified Embodiment)

| Image/Graphic | | | | Text | | | |
|---|---|---|---|---|---|---|---|
| C | M | Y | K | C | M | Y | K |
| 0.10 | 0.10 | 0.10 | 0.10 | 0.30 | 0.30 | 0.30 | 0.30 |

Idth(C), Idth(M), Idth(Y), Idth(K), Idth(C), Idth(M), Idth(Y), Idth(K) — Idth

Fig. 10 (2nd Modified Embodiment)

| File Name | Image Type | Image Position | Density Value | | | | | |
|---|---|---|---|---|---|---|---|---|
| | | | C | M | Y | K | | Id0 |
| overlay3.pcl | Image | ------ | 0.70 | 0.70 | 0.70 | 0.70 | ------ | ------ |
| | Text | ------ | 0.50 | 0.50 | 0.50 | 0.50 | ------ | ------ |

31, 35, 36, 32 (32C, 32M, 32Y, 32K), 33, 34

IMAGE PROCESSING APPARATUS

TECHNICAL FIELD

The present invention relates to an image processing apparatus applied to an image forming apparatus.

BACKGROUND

In an image forming apparatus, for example, printing (image formation) is performed with respect to a print medium such as a sheet of paper (for example, see Patent Document 1).

RELATED ART

[Patent Doc.1] JP Laid-Open Patent Application Publication 2007-301893

However, in an image processing apparatus applied to an image forming apparatus, in general, it is required to improve convenience in printing.

It is desirable to provide an image processing apparatus capable of improving convenience in printing.

SUMMARY

An image processing apparatus disclosed in the application includes an image processing part that creates bitmap data based on print data input from outside, a density correction part that performs pre-determined density correction such that a density of a print image, which is formed on a print medium, is maintained within a regulated range, and a determination part that determines whether or not it is necessary to re-create the bitmap data based on the print data according to a comparison result between a first density value which is created at a timing when the bitmap data is created and a second density value which is created at a timing when the density correction is performed by the density correction part. Wherein the image processing part re-creates the bitmap data based on the print data when the determination part determines that it is necessary to re-create the bitmap data, and does not re-create the bitmap data when the determination part determines that it is not necessary to re-create the bitmap data.

According to an image processing apparatus according to an embodiment of the present invention, it is possible to improve convenience in printing.

BRIEF DESCRIPTION OF THE DRAWINGS

FIGS. 4A and 4B are schematic diagrams illustrating an example of bitmap data creation timing information and threshold information according to the embodiment.

FIG. 5 is a schematic diagram illustrating an example of overlay printing in the image forming apparatus illustrated in FIG. 1.

FIG. 6 is a flow diagram illustrating an example of a reception data storage process and the like.

FIG. 7 is a flow diagram illustrating an example of a bitmap data re-creation determination process and the like.

FIGS. 8A-8D are schematic diagrams illustrating an example of the re-creation determination process illustrated in FIG. 7.

FIGS. 9A and 9B are schematic diagrams illustrating an example of bitmap data creation timing information and threshold information according to a first modified embodiment.

FIG. 10 is a schematic diagram illustrating an example of bitmap data creation timing information according to a second modified embodiment.

DETAILED DESCRIPTION OF THE PREFERRED EMBODIMENTS

In the following, an embodiment of the present invention is described with reference to the drawings. The description will be given in the following order:

1. Embodiment (an example in which a bitmap data re-creation determination process and the like are performed for each of a plurality of colors)
2. Modified Embodiments First modified embodiment (an example of a case where a threshold in a determination process is individually specified for each of a plurality of types of images)

Second modified embodiment (an example of a case where a determination process is partly performed for each of areas of a plurality of types of images)

3. Other Modified Embodiments

1. Embodiment

[Schematic Configuration]

Figure 1:
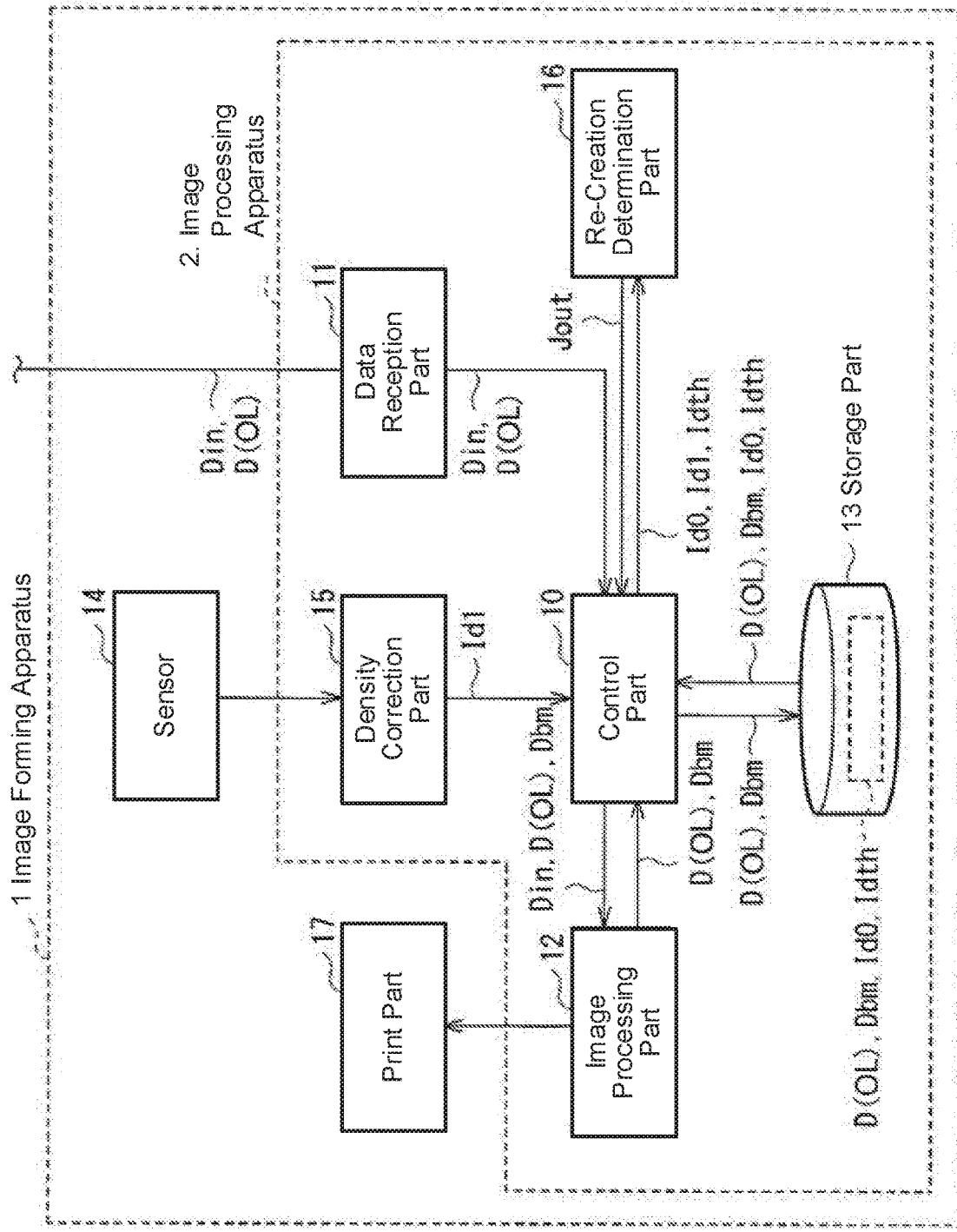
FIG. 1 is a block diagram illustrating an example of a schematic configuration of an image forming apparatus according to an embodiment of the present invention.

FIG. 1 is a schematic block diagram illustrating an example of a schematic configuration of an image forming apparatus (image forming apparatus 1) according to an embodiment of the present invention. The image forming apparatus 1 functions as a printer (a color printer in this example) that forms an image (a color image in this example) with respect to a print medium (for example, a print sheet 9 to be described later) using, for example, an electrophotographic method.

Figure 2:
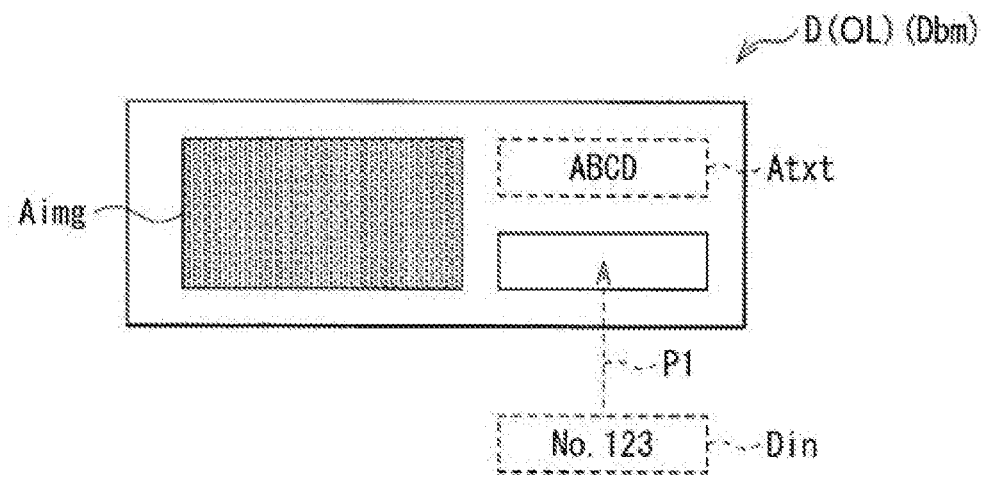
FIG. 2 is a schematic diagram for describing an outline of overlay printing according to the embodiment.

Further, for example, as schematically illustrated in FIG. 2, the image forming apparatus 1 is capable of performing so-called overlay printing. That is, as will be described in detail later, in the overlay printing, first, overlay print data D (OL) as a format is expanded to bitmap data Dbm, and is stored in the image forming apparatus 1 in advance. Then, overlay printing with respect to the print sheet 9 is performed with an image formed by superimposing print data Din input from outside of the image forming apparatus 1 onto the overlay print data D (OL) (see an arrow P1 in FIG. 2). Specifically, in the example illustrated in FIG. 2, the overlay print data D (OL) forms a background image of a ticket including a picture image area Aimg and a text image area Atxt, and the print data Din is information (a ticket number or the like) individually described in each ticket.

The picture image area is composed with one or more pictures, graphics, photos and/or illustrations. The text image area is composed with one or more letters like A, B, C . . . a, b, c and so on, symbols like ?, !, # . . . and/or numbers like 1, 2, 3 . . . .

As illustrated in FIG. 1, the image forming apparatus 1 includes an image processing apparatus 2 that performs predetermined image processing to be described later, a sensor 14, and a print part 17. Further, the image processing apparatus 2 has a control part 10, a data reception part 11, an image processing part 12, a storage part 13, a density correction part 15, and a re-creation determination part 16.

Here, the image processing apparatus 2 corresponds to a specific example of an "image processing apparatus" in the present invention, and the re-creation determination part 16 corresponds to a specific example of a "determination part" in the present invention. Further, the above-described print sheet 9 corresponds to a specific example of a "print medium" in the present invention.

The control part 10 controls an overall operation of the image forming apparatus 1.

The data reception part 11 receives reception data (the print data Din or the overlay print data D (OL)) input from the outside of the image forming apparatus 1. Here, the overlay print data D (OL) is, for example, PDL (Page Description Language) data such as PCL (Printer Control Language) data or PS (PostScript) data. The reception data received in this way is output to the control part 10.

The image processing part 12 is a part that performs image conversion from the above-described reception data to bitmap data to be used in a print operation in the print part 17.

Figure 3:
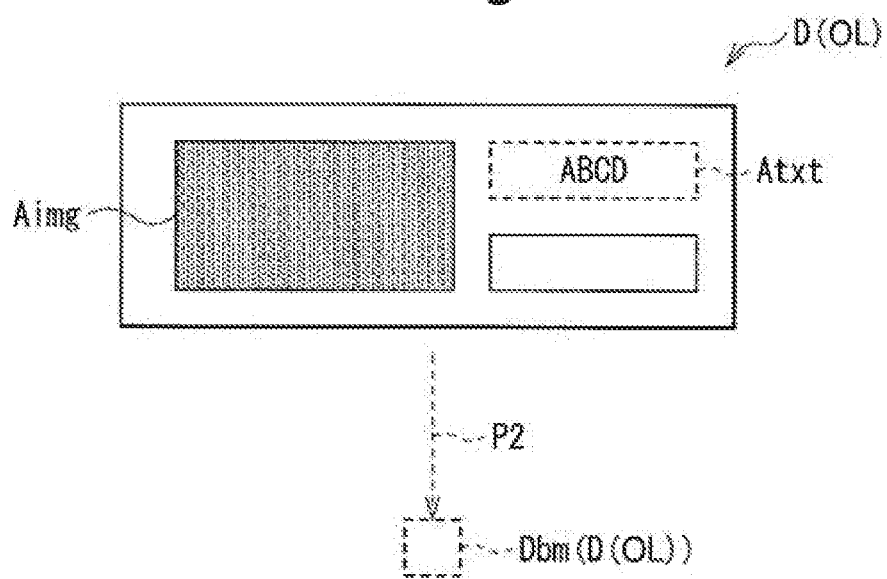
FIG. 3 is a schematic diagram illustrating an example of image conversion to bitmap data in an image processing part illustrated in FIG. 1.

Specifically, for example, as schematically illustrated in FIG. 3, the image processing part 12 creates bitmap data Dbm composed of the overlay print data D (OL) (see an arrow P2 in FIG. 3). As illustrated in FIG. 1, the bitmap data Dbm thus created and the original overlay print data D (OL) (before the image conversion) are each stored in the storage part 13 via the control part 10.

Figures 4A, 5:
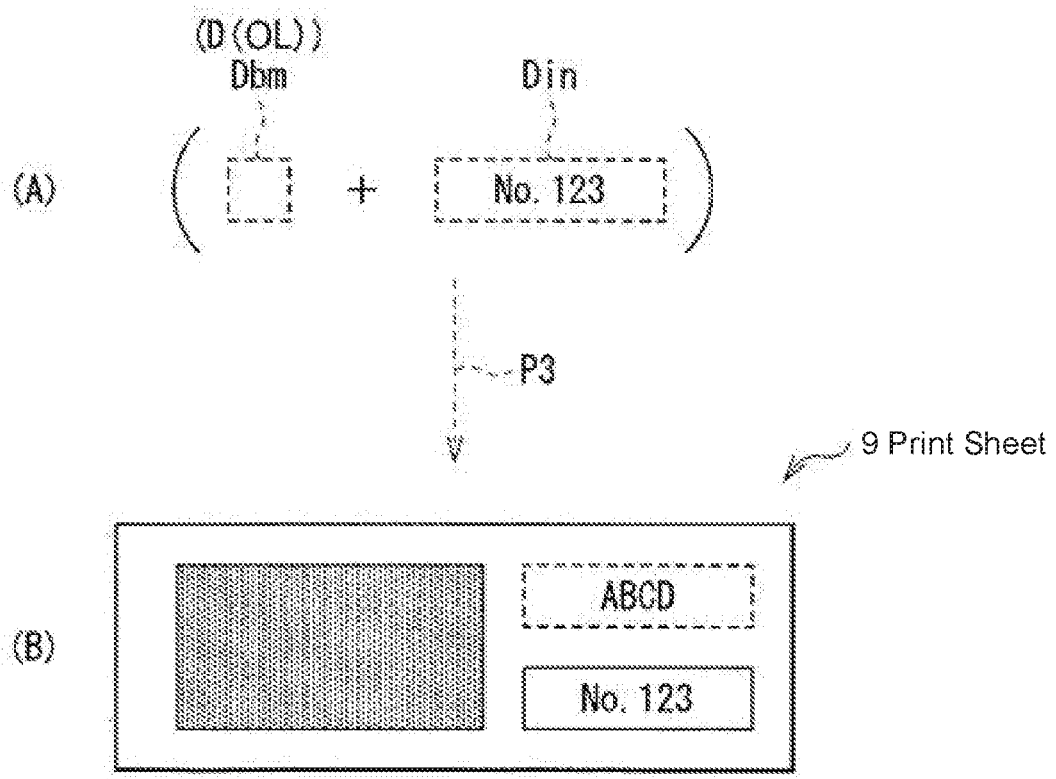

As illustrated in FIG. 1, the storage part 13 is a storage that stores the above-described overlay print data D (OL) and bitmap data Dbm, and various kinds of information including bitmap data creation timing information Id0 and threshold information Idth. The bitmap data creation timing information Id0 includes information about a density value (density value 32 to be described later) and the like when the bitmap data Dbm is created in the image processing part 12. Further, the threshold information Idth (which are Id1, Id2, Id3 . . . ) includes information about a threshold to be used in a determination process (a re-creation determination process of the bitmap data Dbm to be described later) in the re-creation determination part 16 to be described later. Details of the various kinds of information stored in the storage part 13 will be described later (FIGS. 4A and 4B).

The sensor 14 is a sensor that is used, for example, during density correction by the density correction part 15 to be described later. Specifically, the sensor 14, for example, performs detection (reading) of a predetermined image pattern (an image pattern for density correction) printed on the print sheet 9 and outputs a result of the detection to the density correction part 15.

The density correction part 15 is a part that performs predetermined density correction such that a color of a print result output from the print part 17 (a print image on the print sheet 9) is preserved (a color shift is reduced). Specifically, the density correction part 15 performs such density correction according to a correction instruction by a user of the image forming apparatus 1, or regularly for each predetermined period of time (for example, after completing printing of several hundred sheets), by adjusting a density value of ink or toner or the like used in the print part 17. Further, when the density correction is performed, the density value is adjusted using the above-described result of the detection of the image pattern for density correction on the print sheet 9 by the sensor 14. Further, when the image forming apparatus 1 is an apparatus capable of printing a color image including a plurality of colors, the density correction part 15 performs such density correction for each of the plurality of colors. As illustrated in FIG. 1, a result of such density correction is output to the re-creation determination part 16 via the control part 10 as density correction timing information Id1 including a density value (a correction density value 42 to be described later) after the density correction is performed.

Figure 7:
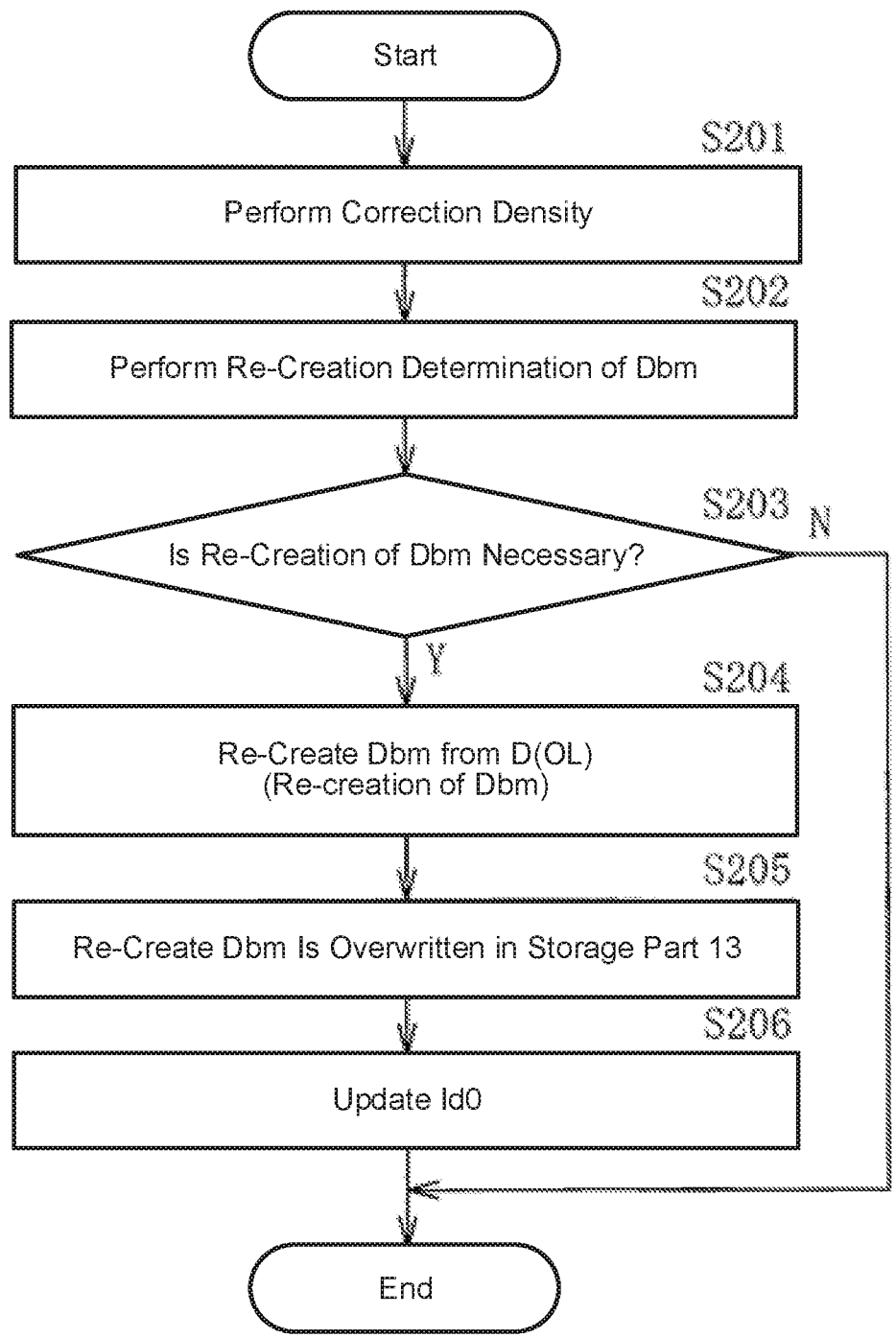

The re-creation determination part 16 is a part that, when the above-described density correction has been performed by the density correction part 15, determines whether or not it is necessary to re-create the bitmap data Dbm in the image processing part 12 based on the overlay print data D (OL) stored in the storage part 13. Specifically, the re-creation determination part 16 performs such re-creation determination according to a result of a comparison between the density value when the bitmap data Dbm is created (the density value 32 (to be described later) included in the above-described bitmap data creation timing information Id0) and the density value after the density correction is performed (the correction density value 42 (to be described later) included in the above-described density correction timing information Id1), the density values being stored in the storage part 13. Further, as described above, when the image forming apparatus 1 is an apparatus capable of printing color image data including a plurality of colors, the re-creation determination part 16 performs such re-creation determination for each of the plurality of colors. That is, the re-creation determination part 16 determines whether or not it is necessary to re-create the bitmap data Dbm by performing a comparison between the density value 32 and the correction density value 42 described above for each of the plurality of colors. As illustrated in FIG. 1, information about a re-creation determination result is output to the control part 10 as a determination result Jout. Further, details of such a re-creation determination process of the bitmap data Dbm will be described later (FIGS. 7-8D).

The print part 17 is a part that performs output of a print image with respect to the print sheet 9 as a print medium by performing a predetermined print operation based on data (bitmap data) of the print image supplied from the control part 10 via the image processing part 12. Specifically, for example, in the case of the overlay printing illustrated in FIG. 2, the print part 17 outputs to the print sheet 9 a print image in which the bitmap data Dbm created based on the overlay print data D (OL) and the bitmap data created based on the print data Din input from outside are superimposed.

[Details of Information Stored in the Storage Part 13]

Here, with reference to FIGS. 4A and 4B, details of various kinds of information stored in the storage part 13 are described. FIGS. 4A and 4B schematically illustrate an example of the bitmap data creation timing information Id0 and the threshold information Idth according to the present embodiment, among the information stored in the storage part 13 as described above.

First, the bitmap data creation timing information Id0 illustrated in FIG. 4A includes various kinds of information such as a file name 31, a density value 32, an original data storage address 33, and a bitmap data storage address 34. The file name 41 is information indicating a file name of the bitmap data Dbm stored in the storage part 13. The density value 32 is information indicating a density value when the bitmap data Dbm is created in the image processing part 12. In this example, density values 32C, 32M, 32Y, and 32K are respectively specified for a plurality of colors of cyan (C), magenta (M), yellow (Y) and black (K). The original data storage address 33 is information indicating a storage address, in the storage part 13, of the overlay print data D (OL) as original data when the bitmap data Dbm is created. The bitmap data storage address 34 is information indicating a storage address of the created bitmap data Dbm in the storage part 13.

The density values 32 (32C, 32M, 32Y, 32K) each correspond to a specific example of "a first density value" in the present invention. Further, the correction density values 42 (42C, 42M, 42Y, 42K) after the above-described density correction is performed each correspond to a specific example of "a second density value" in the present invention.

On the other hand, the threshold information Idth illustrated in FIG. 4B includes information indicating thresholds used in the above-described determination process (the re-creation determination process of the bitmap data Dbm) in the re-creation determination part 16. Specifically, in this example, thresholds Idth (C), Idth (M), Idth (Y), Idth (K) are respectively specified for the plurality of colors of cyan, magenta, yellow and black. In the example illustrated in FIG. 4B, Idth (C)=Idth (M)=Idth (K)=0.05 and Idth (Y)=0.10, which are different between the plurality of colors.

[Operation and Effects]
(A. Basic Operation)

In the image forming apparatus 1, an image is formed with respect to the print sheet 9 (a print operation is performed) as follows. In other words, when print data is supplied to the image forming apparatus 1 from an external apparatus such as a PC (Personal Computer) or the like via a communication line or the like, based on the print data etc., the control part 10 performs various kinds of control such that a print operation is performed by the blocks in the image forming apparatus 1.

In particular, for example, as illustrated in FIG. 5, in the case where the above-described overlay printing is performed, the overlay printing is performed in the image forming apparatus 1 as follows.

That is, when the overlay printing is performed, first, the overlay print data D (OL) as a format is expanded to the bitmap data Dbm and then stored in advance in the storage part 13 (see FIG. 1). Then, for example, as illustrated in (A) of FIG. 5, with respect to the bitmap data Dbm of the overlay print data D (OL), the print data Din input from the outside of the image forming apparatus 1 is superimposed. As a result, for example, with an image as illustrated in (B) of FIG. 5 (see an arrow P3), the overlay printing with respect to the print sheet 9 is performed. By performing such overlay printing, it is possible to shorten a printing time (execution time of the printing).

(B. Reception Data Storage Process and the Like)

Figure 6:
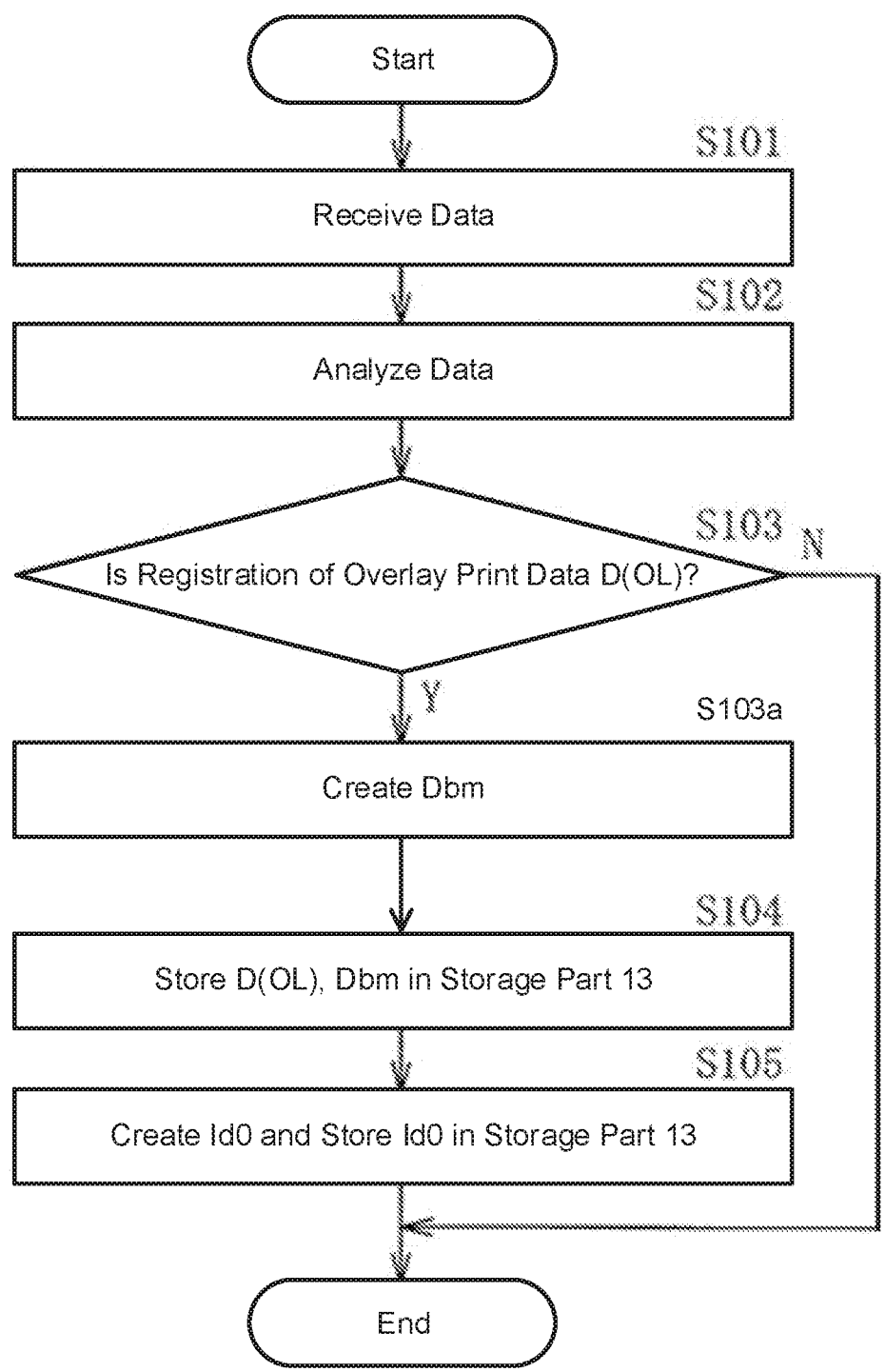

Next, with reference to FIG. 6, a process of storing reception data input from the outside of the image forming apparatus 1 to the storage part 13 is described. FIG. 6 is a a flow diagram illustrating an example of such a storage process of the reception data.

In the storage process of the reception data, first, when the data reception part 11 receives data from the outside of the image forming apparatus 1 (Step S101 of FIG. 6), the control part 10 causes the image processing part 12 to perform the following image conversion. That is, the image processing part 12 creates a bit map data based on the reception data and subjects the reception data acquired from the data reception part 11 via the control part 10 to data analysis (Step S102). In other words, the image processing part 12 determines a type of the reception data based on the reception data.

Next, the control part 10 determines whether or not the reception data is registration of the overlay print data D (OL) (Step S103). Here, when it is determined that the reception data is not the registration of the overlay print data D (OL) (Step S103:N), the reception data (input data Din) is not stored in the storage part 13, but is used in a print operation in the print part 17, and the storage process illustrated in FIG. 6 is completed.

On the other hand, when it is determined that the reception data is registration of the overlay print data D (OL) (Step S103: Y), the process proceeds as follows. That is, in this case, first, the overlay print data D (OL) and the bitmap data Dbm created from the overlay print data D (OL) are each stored in the storage part 13 (Step S104). Then, the control part 10 creates the bitmap data creation timing information Id0 (see FIG. 4A) including the density values 32 (32C, 32M, 32Y, 32K) when the bitmap data Dbm is created, and stores the bitmap data creation timing information Id0 in the storage part 13 (Step S105). As a result, the storage process and the like illustrated in FIG. 6 are completed.

(C. Re-Creation Determination Process of the Bitmap Data Dbm and the Like)

Next, with reference to FIG. 7 and FIGS. 8A-8D, the re-creation determination process of the bitmap data Dbm is described. FIG. 7 is a flow diagram illustrating an example of such a re-creation determination process of the bitmap data Dbm. Further, FIGS. 8A-8D schematically illustrate an example of the re-creation determination process illustrated in FIG. 7.

In the re-creation determination process of the bitmap data Dbm, first, the density correction part 15 performs the above-described density correction for each of the plurality of colors by performing density value adjustment using the detection result of the image pattern for density correction on the print sheet 9 by the sensor 14 (Step S201 of FIG. 7). Next, when the density correction timing information Id1 as a result of such density correction is acquired from the density correction part 15, the control part 10 causes the re-creation determination part 16 to perform the following re-creation determination of the bitmap data Dbm.

That is, the re-creation determination part 16 performs the above-described re-creation determination for each of the plurality of colors according to a result of a comparison between the density value 32 when the bitmap data Dbm is created and the correction density value 42 after the density correction is performed (the above-described density correction timing information Id1) (Step S202). Further, the re-creation determination part 16 performs such a re-creation determination process according to a relation in magnitude between a difference value (density difference value) between the density value 32 and the correction density value 42 and the above-described threshold (the thresholds Idth (C), Idth (M), Idth (Y), Idth (K) of the plurality of colors). Specifically, when the density difference value is equal to or larger than the threshold, the re-creation determination part 16 determines that it is necessary to re-create the bitmap data Dbm based on the overlay print data D (OL) stored in the storage part 13 (Step S203: Y). On the other hand, when the density difference value is less than the threshold, the re-creation determination part 16 determines that it is not necessary to re-create the bitmap data Dbm based on the overlay print data D (OL) stored in the storage part 13 (Step S203: N).

Here, with reference to FIGS. 8A-8D, such a re-creation determination process of the bitmap data Dbm is more specifically described. FIG. 8A illustrates an example of the density values 32 (32C, 32M, 32Y, 32K) included in the above-described bitmap data creation timing information Id0 (see FIG. 4A) when the bitmap data Dbm is created. On the other hand, FIG. 8B illustrates an example of the correction density values 42 (42C, 42M, 42Y, 42K) included in the above-described density correction timing information Id1 after the density correction is performed. Further, FIG. 8C illustrates an example of the density difference value ("the correction density value 42–the density value 32: Id1–Id0) for each of the plurality of colors. Further, FIG. 8D illustrates an example of the thresholds Idth (C), Idth (M), Idth (Y), Idth (K) for the plurality of colors included in the above-described threshold information Idth (see FIG. 4B).

In the example illustrated in FIGS. 8A-8D, as illustrated by reference numeral symbols P41, P42, the density difference value ("0.10"), which is denoted with P43 in FIG. 8D, for magenta (M) is equal to or larger than the threshold Idth (M) ("0.05") for magenta (see FIG. 8C and FIG. 8D). On the other hand, the density difference values ("0.00") for the other colors (cyan (C), yellow (Y), black (K)) are respectively smaller than the thresholds Idth (C), Idth (K) ("0.05") and the threshold Idth (Y) ("0.10") (see FIG. 8C).

Therefore, in this example, the re-creation determination part 16 determines that, for an image of magenta (M), it is necessary to re-create the bitmap data Dbm based on the overlay print data D (OL) stored in the storage part 13. On the other hand, the re-creation determination part 16 determines that, for images of the other colors (cyan (C), yellow (Y), and black (K)), it is not necessary to re-create the bitmap data Dbm based on the overlay print data D (OL) stored in the storage part 13.

Here, when it is determined that it is necessary to re-create the bitmap data Dbm (Step S203: Y), the image processing part 12 re-creates the bitmap data Dbm by performing image conversion based on the overlay print data D (OL) stored in the storage part 13 (Step S204). In the process, the density difference values also are considered to re-create the bitmap data. Subsequently, the bitmap data Dbm re-created in this way is overwritten and stored in the storage part 13 (Step S205). Then, the control part 10 updates the density values 32 (32C, 32M, 32Y, 32K) included in the bitmap data creation timing information Id0 (see FIG. 4A) when the bitmap data Dbm is created to the re-created density values. In other words, the control part 10 rewrites and updates the bitmap data creation timing information Id0 (see FIG. 4A) including such density values 32 to the re-created information in the storage part 13 (Step S206). In this way, when the bitmap data Dbm is re-created, the re-created bitmap data Dbm and the density values 32 when the bitmap data Dbm is re-created are respectively overwritten and updated in the storage part 13. Then, as a result, the re-creation process and the like illustrated in FIG. 7 are completed.

On the other hand, when it is determined that it is not necessary to re-create the bitmap data Dbm (Step S203: N), re-creation of the bitmap data Dbm and the like by the image processing part 12 are not performed and the re-creation process and the like illustrated in FIG. 7 are completed. That is, in the present embodiment, the image processing part 12 performs re-creation of the bitmap data Dbm based on the overlay print data D (OL) only when the re-creation determination part 16 determines that it is necessary to re-create the bitmap data Dbm.

(D. Effects)

In this way, in the image forming apparatus 1 (image processing apparatus 2) of the present embodiment, the selective re-creation of the bitmap data Dbm is performed as follows. That is, first, according on a result of a comparison between the density value 32 when the bitmap data Dbm is created based on the overlay print data D (OL) and the correction density value 42 after the density correction by the density correction part 15 is performed, the re-creation determination part 16 determines whether or not it is necessary to re-create the bitmap data Dbm based on the overlay print data D (OL). Then, the image processing part 12 performs re-creation of the bitmap data Dbm based on the overlay print data D (OL) only when it is determined that it is necessary to re-create the bitmap data Dbm.

In the present embodiment, by performing such selective re-creation of the bitmap data Dbm, the following effects are achieved. That is, when it is determined that re-creation of the bitmap data Dbm is unnecessary even after density correction is performed, since such re-creation is not performed, a waiting time during printing (for example, continuous printing or the like) can be kept short as compared to a case where re-creation is always performed after density correction is performed (comparative example) or the like. Therefore, in the present embodiment, in this way, convenience in printing can be improved as compared to the comparative example or the like in which the bitmap data Dbm is re-created every time density correction is performed.

Further, in the present embodiment, when the image forming apparatus 1 is an apparatus capable of printing color image data including a plurality of colors, the density correction part 15 performs density correction for each of the plurality of colors, and the re-creation determination part 16 determines whether or not it is necessary to re-create the bitmap data Dbm for each of the plurality of colors. Therefore, the following effects are achieved. That is, the selective re-creation of the bitmap data Dbm is performed for such an image unit of each of the plurality of colors. Therefore, a waiting time during printing (for example, continuous printing or the like) is further shortened, and as a result, convenience in printing can be further improved.

2. Modified Embodiments

Next, modified embodiments (first and second modified embodiments) of the above-described embodiment are described. In the following modified embodiments, the same reference numeral symbols are assigned to configuration elements that are the same as in the embodiment, and description thereof is omitted as appropriate.

First Modified Embodiment

FIGS. 9A and 9B schematically illustrate an example of bitmap data creation timing information Id0 and threshold information Idth according to the first modified embodiment.

First, the bitmap data creation timing information Id0 according to the first modified embodiment illustrated in FIG. 9A further includes information about an image type 35 in the bitmap data creation timing information Id0 (see FIG. 4A) according to the embodiment. That is, the bitmap data creation timing information Id0 according to the first modified embodiment includes various kinds of information such as a file name 31, a density value 32, an original data storage address 33, a bitmap data storage address 34, and an image type 35. The image type 35 is information indicating an image type in the overlay print data D (OL) (the bitmap data Dbm), and examples of image types include a picture image ("picture"), a graphic image ("graphic"), a text image ("text"), and the like.

Further, the threshold information Idth according to the first modified embodiment illustrated in FIG. 9B individually specifies thresholds in the above-described re-creation determination process for each content of the above-described image type 35 (an image type in the overlay print data D (OL)) in the threshold information Idth according to the embodiment. Specifically, in the example illustrated in FIG. 9B, the thresholds Idth (C), Idth (M), Idth (Y), Idth (K) are respectively specified for the above-described image types including "picture/graphic" and "text." That is, in the case of "picture/graphic," Idth (C)=Idth (M)=Idth (Y)=Idth (K)=0.10, and, in the case of "text," Idth (C)=Idth (M)=Idth (Y)=Idth (K)=0.30, which are different between the image types. In this example, the values of the thresholds Idth (C), Idth (M), Idth (Y), Idth (K) are each larger in the case of "text" than in the case of "picture/graphic."

In this way, in the first modified embodiment, the thresholds in the re-creation determination process of the bitmap data Dbm are individually specified for each image type in the overlay print data D (OL) (the bitmap data Dbm). Therefore, the following effects are achieved. That is, the selective re-creation of the bitmap data Dbm described in the embodiment is more appropriately performed according to an image type. Therefore, a waiting time during printing (for example, continuous printing or the like) is further shortened, and as a result, convenience in printing can be further improved.

Second Modified Embodiment

FIG. 10 schematically illustrates an example of bitmap data creation timing information Id0 according to the second modified embodiment.

First, also in the second modified embodiment, similar to the above-described first modified embodiment, the thresholds in the re-creation determination process of the bitmap data Dbm are individually specified for each image type in the overlay print data D (OL) (the bitmap data Dbm) (for example, see FIG. 9B).

Further, for example, as illustrated in FIG. 10, when a plurality of types of images are included in the overlay print data D (OL) (the bitmap data Dbm), the bitmap data creation timing information Id0 according to the second modified embodiment is as follows. That is, information about an image position 36 of each image type 35 described in the first modified embodiment is further included in the bitmap data creation timing information Id0. Therefore, the bitmap data creation timing information Id0 according to the second modified embodiment includes various kinds of information such as a file name 31, a density value 32, an original data storage address 33, a bitmap data storage address 34, an image type 35, and an image position 36.

Then, in the second modified embodiment, the re-creation determination part 16 partly determines whether or not it is necessary to re-create the bitmap data Dbm for each of areas where such a plurality of types of images are respectively positioned (for each of the image positions 36 respectively corresponding to the image types 35). Specifically, for example, in the case of the bitmap data Dbm of the overlay print data D (OL) illustrated in FIG. 2, whether or not it is necessary to re-create the bitmap data Dbm is partly determined for each of the picture image area Aimg and the text image area Atxt included therein. That is, in this example, for the picture image area Aimg, for example, the thresholds for the case of "picture/graphic" illustrated in FIG. 9B are used to perform the above-described re-creation determination process. On the other hand, for the text image area Atxt, for example, the thresholds for the case of "text" illustrated in FIG. 9B are used to perform the above-described re-creation determination process.

In this way, in the second modified embodiment, when a plurality of types of images are included in the overlay print data D (OL) (the bitmap data Dbm), the re-creation determination part 16 partly determines whether or not it is necessary to re-create the bitmap data Dbm for each of areas where such a plurality of types of images are respectively positioned. Therefore, the following effects are achieved. That is, the selective re-creation of the bitmap data Dbm described in the embodiment is performed individually for each of the areas where the plurality of types of images are respectively positioned. Therefore, such selective re-creation of the bitmap data Dbm is performed not only when necessary, but also only in a necessary area (image area). Therefore, in the second modified embodiment, a waiting time during printing (for example, continuous printing or the like) is further shortened, and as a result, convenience in printing can be further improved.

3. Other Modified Embodiments

In the above, the present invention is described by illustrating the embodiment and the modified embodiments. However, the present invention is not limited to these embodiments and the like, and various modifications are possible.

For example, in the embodiment and the like, configurations of the blocks of the image forming apparatus are specifically described. However, the configurations of the blocks are not limited to those described in the embodiment and the like, and other configurations are also possible. Further, values, ranges, relations in magnitude, and the like of various kinds of information (parameters) described in the embodiment and the like are also not limited to those described in the embodiment and the like, but may be adjusted to other values, ranges, relations in magnitude, and the like.

Further, in the embodiment and the like, the image processing apparatus (the image processing apparatus 2) applied to overlay printing using the overlay print data D (OL) is described as an example. However, the present invention is not limited to this example. That is, the present invention is also applicable to a case (an image processing apparatus) in which print data of a type other than that of such overlay print data D (OL) is image-converted to the bitmap data Dbm.

Further, in the embodiment and the like, the storage process and the like of the overlay print data D (OL) and the like, and the re-creation determination process and the like of the bitmap data Dbm are specifically described. However, the methods of these processes are not limited to those described in the embodiment and the like. That is, it is also possible to perform the storage process of the overlay print data D (OL) and the like and the re-creation determination process and the like of the bitmap data Dbm using methods other than those of the above. Further, the method specifying the thresholds in the re-creation determination process of the bitmap data Dbm, the image types and the like are also not limited to the methods described in the embodiment and the like, and it is also possible to use methods other those of the above.

In addition, in the above embodiment and the like, the case where the overlay print data D (OL) and the print data Din are each color image data including a plurality of colors is described as an example. However, the present invention is not limited to this example. For example, the present invention is also applicable to a case of black-and-white (monochrome) image data.

Further, the series of processes described in the above embodiment and the like may be performed using hardware (circuits) or using software (programs). When the processes are performed using software, the software includes a group of programs for causing the functions to be executed by a computer. The programs, for example, may be used by being incorporated in advance into the computer, or may be used after being installed into the computer from a network or a recording medium.

Further, in the above embodiment and the like, as a specific example of the "image forming apparatus" of the present invention, an image forming apparatus (printer) having a print function is described. However, the present invention is not limited to this. That is, in addition to such an image forming apparatus having a print function, for example, the present invention can also be applied to an image forming apparatus (a copy machine or a facsimile) having a scan function or a fax function, or an image forming apparatus (a multifunction machine) having a combination of these functions.

What is claimed is:

1. An image processing apparatus comprising:
    a processor; and
    a storage part, wherein
    the processor is configured to function as:
        a density correction part that adjusts a density value of print data in response to a pre-determined instructions and performs a density correction to output the adjusted density value such that a density of a print image on a print medium is maintained,
        an image processing part that, when the print data input from outside is designated to be stored in the storage part, creates bitmap data based on the print data and stores the print data, the bitmap data and a first density value by associating with each other in the storage part, the first density value being a density value at time of creating the bitmap data; and
        a determination part that, after storing the bitmap data and when the density correction is performed by the density correction part in response to the pre-determined instructions, determines whether or not it is necessary to re-create the bitmap data stored in the storage part from the print data, based on a result of comparison between the first density value and a second density value, the second density value being the adjusted density value adjusted by performing the density correction after the bitmap data is stored,
    the image processing part
        re-creates the bitmap data based on the stored print data when the determination part determines that it is necessary to re-create the bitmap data, and
        stores the re-created bitmap data, the print data and the second density value by associating with each other in the storage part, the second density value being stored as the first density value, and
        outputs the re-created bitmap data for printing the print image on the print medium.

2. The image processing apparatus according to claim 1, wherein
    the determination part determines
        that it is necessary to re-create the bitmap data when a density difference value between the first density value and the second density value is equal to or larger than a predetermined threshold.

3. The image processing apparatus according to claim 2, wherein
    the print data is composed with images in several types, which include a picture image and a text image, and
    the predetermined threshold for the print data is composed with threshold values each of which is specified to either the picture image or the text image.

4. The image processing apparatus according to claim 3, wherein
    each of the images in the several types in the print data has its position data and the first density value, and
    the determination part determines whether or not it is necessary to re-create the bitmap data at every position data.

5. The image processing apparatus according to claim 2 further comprising:
    the storage part storing the threshold.

6. The image processing apparatus according to claim 1, wherein
    the print data is color image data including a plurality of colors,
    the density correction part performs the density correction for each of the colors, and
    the determination part determines whether or not it is necessary to re-create the bitmap data by performing the comparison between the first density value and the second density value for each of the colors.

7. The image processing apparatus according to claim 1, wherein
    the print data is for overlay print data, and
    the image processing apparatus is specified for the overlay printing using the overlay print data.

8. The image processing apparatus according to claim 2, wherein
    when the determination part determines that it is necessary to re-create the bitmap data, the image processing part re-creates the bitmap data based on the density difference value in addition to the print data.

* * * * *